July 22, 1969   E. D. SCHMIDT ET AL   3,456,548

SCREW WITH HEXAGONAL-COLLARED SLOTTED HEAD

Filed Nov. 22, 1967

INVENTORS
EUGENE D. SCHMIDT
ERWIN L. SCHAUB
BY
Albert C. Johnston
ATTORNEY

United States Patent Office 3,456,548
Patented July 22, 1969

3,456,548
SCREW WITH HEXAGONAL-COLLARED SLOTTED HEAD
Eugene D. Schmidt, Glendale, and Erwin L. Schaub, Middle Village, N.Y., assignors to Ideal Corporation, Brooklyn, N.Y., a corporation of New York
Filed Nov. 22, 1967, Ser. No. 684,984
Int. Cl. F16b 23/00
U.S. Cl. 85—9                                         5 Claims

ABSTRACT OF THE DISCLOSURE

A durable, uniformly hardened screw having a completely integral hexagonal collared slotted head is made by cold heading a screw blank to give it a circular radial flange adjacent to a head end portion that is to be slotted, slotting that end portion, then die-forming the flange upwardly into a collar of hexagonal cross-section surrounding the slotted end portion, with the slot aligned with opposite corners of the collar, and heat treating the formed structure to harden it.

---

This invention relates to a new and improved screw for use as a clamp tightener and for other uses requiring high screw driving forces, and to the method of manufacturing this screw. More particularly, it relates to screws of the type provided with a hexagonal head for engagement by a wrench and having a screw driver slot formed in a recessed end face of the head.

Screws of that type are conventionally made by the struck slot method, that is, the hexagonal head, recessed end face and slot are all formed by deforming a suitable screw blank in a cold header. The slot in a screw head thus made has an objectionable taper, as its sides converge in the direction of its depth, and the corners at the top and bottom of the slot are not square but curve at objectionably large radii. Moreover, the slotted end face can be recessed by only a quite limited distance. Consequently, the collar obtained does not serve well for guiding a screw driver blade into the slot, and the blade often will slip out of the slot when a high driving torque is applied through the blade.

It would be possible to produce screws of the type mentioned by forming a hexagonal head on a screw blank in a cold header, then slotting the end face of the head, and then crimping a separately drawn cap about the head to form a collar surrounding and projecting beyond the slotted end face. Such a method, however, would be relatively expensive; and since the separately drawn cap to be crimped about the head would be limited in wall thickness and not amenable to the heat treatment given to the body of the screw, the hexagonal head obtained would not have the required resistance to forces to be applied to it by a wrench.

It is an object of this invention to provide a screw with a durable hexagonal collared slotted head which will withstand strong forces applied to it by a wrench and will present a substantially square collared slotted end for non-slipping engagement by a screw driver blade.

Another object is to provide such a screw which is substantially uniformly hardened throughout its entire structure, and which can be so hardened by a single heat treatment.

A further object of the invention is to provide a reliable and relatively inexpensive method of manufacturing such a screw.

It has been found that the objects stated can be attained by forming a screw blank composed of a suitable metal, such as a quench-hardenable steel commonly used for machine screw stock, with a head having a wide circular flange extending radially therefrom adjacent to the end portion thereof that is to be slotted, then slotting that end portion diametrically, and then forcing the screw blank through a forming die of hexagonal cross-section to deform the metal of the flange into a correspondingly hexagonal collar surrounding the slotted end portion and extending axially a small distance beyond its end face.

Since the slotted end portion and the hexagonal collar as thus formed are integral portions of the same piece of metal, the entire structure can be heat treated after the head is collared, as by suitably heating and quenching it for hardening the metal, so that the collared head will possess the requisite hardness and resistance to mutilation when strong forces are applied to it by either a wrench or a screw driver. Further, the slot formed in the end portion of the head before the die-forming operation can be extended completely across the same and made with substantially parallel sides terminating in substantially square corners at top and bottom; and it has been found that these important qualities of the slot will be preserved during the deformation of the metal of the integral flange about the slotted head end in the die-forming operation. Therefore, an efficient slot is obtained in the product, along with two beneficial functions of the hexagonal collar thus formed, which collar enables the screw to be driven strongly by a wrench and assists in the use of a screw driver to drive the screw by guiding and holding the blade to the slot in the screw head.

When the screw blank is subjected to the die-forming operation, the diametrical slot previously formed in the end portion of the head is located in alignment with two opposite corners of the hexagonal die. It has been found that in this way the metal of the circular flange being displaced upwardly into a hexagonal collar bearing against the slotted end portion will not be forced into either end of the slot.

The above and objects, features and advantages of the invention will be further apparent from the following detailed description and the accompanying drawing of an illustrative embodiment of the invention. In the drawing.

Figure 2:
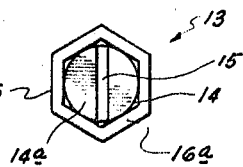
FIG. 2 is a head end view thereof.
Figure 1:
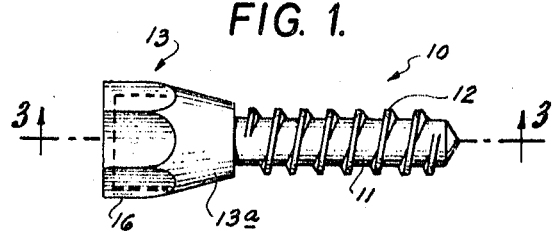
FIG. 1 is a side elevational view of a screw according to this invention.
Figure 3:
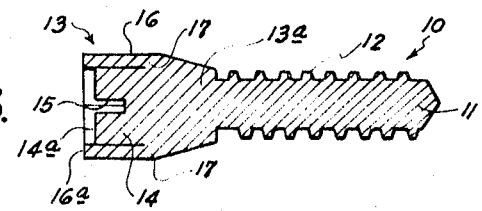
FIG. 3 is an axial sectional view, thereof, taken along line 3—3 of FIG. 1.
Figure 5:
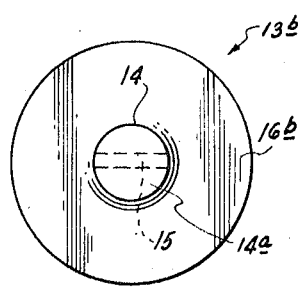
FIG. 5 is an end view of said blank.

Referring to FIGS. 1, 2 and 3 of the drawing, it will be seen that a screw 10 made according to this invention has a shank 11 which is suitably threaded as at 12 (FIGS. 1 and 3) and has its head end 13 formed into a hexagonal collared slotted structure which in its entirety is integral with the threaded shank.

The head end 13 as shown consists of a formed metal body having a base portion 13a integral with the shank 11, having a substantially cylindrical end portion 14 provided with a slot 15 cut diametrically across its entire width and squarely into it to receive the end of a screw driver blade, and having a hexagonal collar 16 which is rooted integrally with the metal body in an annular zone 17 between the base portion 13a and the end portion 14 and which extends coaxially with and against the sides of the slotted end portion 14 and projects beyond the same to terminate in an edge 16a spaced a small distance above the end face 14a of portion 14. The base portion 13a may be tapered as shown or of a cylindrical or other desired form.

The integral hexagonal collar 16 serves to engage the top of a screw driver blade and guide it into the slot 15 upon rotation of the blade, and to prevent slipping of the blade out of either end of the slot 15 and, in addition, to give the screw head 13 an outer hexagonal surface which is engageable by a wrench and is so united with the body of the screw that it will withstand extremely high torque loads applied by the wrench.

Figure 4:
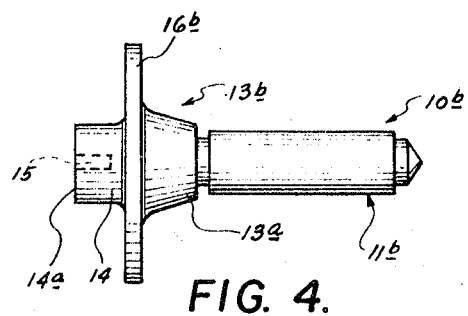
FIG. 4 is a side elevational view of a cold headed screw blank from which the screw of FIGS. 1-3 is formed.

For the manufacture of the above-described screw, a piece of rod stock composed of a quench-hardenable steel suitable for machine screw manufacture is first cold pressed into a screw blank 10b having the form shown in FIG. 4. This blank has an unthreaded shank portion 11b extending axially from a head 13b which comprises a base portion 13a and a nearly cylindrical end portion 14 and, adjacent to the end portion between it and the base portion, a merging circular radial flange 16b of relatively large diameter. The flange 16b protrudes outwardly from and about its annular root with a radial width next to the end portion 14 greater than the axial length of said end portion. When the blank has been thus cold headed, a screw driver slot 15 of the desired form is cut entirely across the end portion 14 so as to open diametrically through its end face 14a. The slot can be conveniently milled into the end of the blank so as to have substantially parallel side walls terminating in substantially square corners at top and bottom, for effective non-slipping engagement by a screw driver blade.

Figure 7:
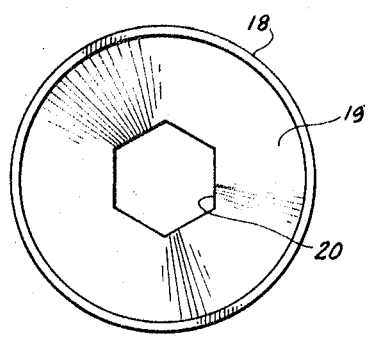
FIG. 7 is an end view of the entry end of said die.
Figure 6:
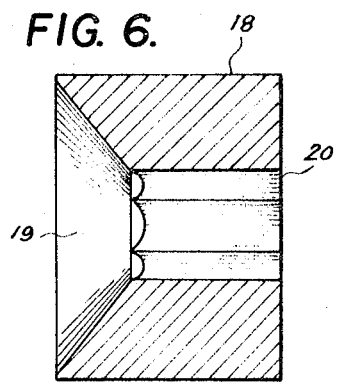
FIG. 6 is an axial sectional view of a hexagonal die for deforming the head of the blank of FIGS. 4 and 5 into the screw head of FIG. 1-3.

After the head portion 14 is slotted, the entire blank 10b is forced axially through a forming die 18 (FIGS. 6 and 7) having a frusto-conical entry surface 19 which tapers concavely from a diameter at least as large as that of radial flange 16b into an elongated bore 20 of uniform hexagonal cross-section corresponding to the hexagonal shape desired for the outer surface of the head 13 of the finished screw (FIGS. 1 and 2). The diameter of the die bore approximates the largest diameter of the base portion 13a of the blank, so that only the flange 16b is constrained and deformed by the die.

The blank is inserted shank-first into the entry end of the die 18 and is so positioned that the ends of its slot 15 are aligned with opposite corners of the hexagonal wall of bore 20. Then the blank is drawn slowly through the die, as by force applied to the end of shank portion 11b, until its head 13b has passed entirely through the bore 20. In the course of this die-forming operation, the metal of the flange 16b is displaced and formed axially along and against the side wall of the slotted end portion 14, into a straight hexagonal collar 16 (FIGS. 1–3) having the hexagonal shape and dimensions of the die bore 20. This collar bears tangentially against the end portion 14 along the sides but not at the corners of its hexagonal wall, as indicated in FIG. 2, and it extends to a hexagonal terminal edge 16a spaced a desired distance away from the end face 14a. Thus, the ends and the desired form of the slot 15 are in no way distorted or obstructed by the die-forming operation, and a hexagonal collar completely integral with the screw body and giving the desired additional functions to the head 13 is readily obtained.

The hexagonal collar can be given desired heights, or axial lengths, by appropriate selection of the diameter and the thickness of the flange 16b in relation to the diameter and the length of the end portion 14 of the head 13a. For example, the flange may be formed with a diameter of approximately .645" and a thickness of approximately .033" at its edge in a case where the hexagonal collar is to have a width of approximately .375" between its opposite faces and is to extend approximately .06" beyond the end face of a head end portion of .310" in diameter slotted to a depth of approximately .100" from its end face.

The formation of the screw 10 is completed by suitably threading the shank 11a of the die-formed blank. Then the entire screw is hardened by a suitable heat treatment, as by heating and then quenching it. Thus, both the collar 16 and the slotted end portion 14 of the head 13 are obtained in a uniformly hardened condition which prevents distortion or mutilation of the screw head under very strong forces applied to it either by a screw driver engaged in slot 15 or by a wrench engaging the hexagonal outer surface of collar 16.

It is to be understood that the invention is not limited to details of the particular embodiment hereinabove described and shown in the drawing and that various modifications may be effected therein without departing from the scope of the invention.

What is claimed is:

1. A screw composed of a single piece of metal constituting threaded shank portion integral with a hexagonal collared slotted head, said head having a base portion adjacent to said shank portion, a substantially cylindrical end portion having a slot therein entirely across the end face thereof for driving engagement by a screw driver blade, and a hexagonal collar surrounding said end portion for driving engagement by a wrench, said collar extending axially along and having its sides bearing tangentially against said end portion from an annular root of said collar to the plane of said end face, said root being integral with the metal of said head between said base portion and said end portion.

2. A screw according to claim 1, said collar extending axially beyond said end portion to terminate in a hexagonal edge lying in a plane spaced from the plane of said slotted end face.

3. A screw according to claim 1, the slot in said end portion being aligned with opposite corners of said hexagonal collar.

4. A screw according to claim 1, the metal of said head, including said end portion and said hexagonal collar, being hardened substantially uniformly throughout.

5. A screw according to claim 1, said slot having substantially parallel side walls terminating in substantially square corners at top and bottom, for secure non-slipping engagement with said blade.

References Cited

UNITED STATES PATENTS

| | | | |
|---|---|---|---|
| 1,740,602 | 12/1929 | Keeler | 85—45 |
| 2,120,061 | 6/1938 | Blakeslee | 85—9 |
| 2,213,813 | 9/1940 | Hunt | 85—45 |
| 2,338,023 | 12/1943 | Bugg | 85—45 |
| 2,386,629 | 10/1945 | North et al. | 85—45 |
| 2,833,325 | 5/1958 | Laisy | 85—45 |
| 3,152,507 | 10/1964 | Wieber | 85—9 |
| 3,351,989 | 11/1967 | Cheris et al. | 24—274 |

FOREIGN PATENTS

| | | |
|---|---|---|
| 517,867 | 3/1953 | Belgium. |
| 39,477 | 9/1965 | Germany. |

MARION PARSONS, Jr., Primary Examiner

U.S. Cl. X.R.

10—27; 85—45